United States Patent [19]
Tokushima et al.

[11] Patent Number: 4,761,330
[45] Date of Patent: Aug. 2, 1988

[54] OPTOMAGNETIC RECORDING MEDIUM

[75] Inventors: Tadao Tokushima; Makato Shiraki, both of Hamamatsu, Japan

[73] Assignee: Nippon Gakki Seizo Kabushiki Kaisha, Japan

[21] Appl. No.: 846,713

[22] Filed: Apr. 1, 1986

[30] Foreign Application Priority Data

Apr. 3, 1985 [JP] Japan .................. 60-070724

[51] Int. Cl.$^4$ .................. G11B 7/24
[52] U.S. Cl. .................. 428/312.8; 428/319.1; 428/336; 428/472; 428/694; 428/900
[58] Field of Search .............. 428/307.3, 312.8, 314.2, 428/315.9, 318.6, 319.1, 336, 472, 694, 900

[56] References Cited

U.S. PATENT DOCUMENTS

| 4,109,287 | 8/1978 | Kawai et al. .................. 360/131 |
| 4,210,946 | 7/1980 | Iwasaki et al. .................. 428/900 |
| 4,277,809 | 7/1981 | Fisher et al. .................. 428/900 |
| 4,430,387 | 2/1984 | Nakagawa et al. .................. 428/579 |
| 4,548,682 | 10/1985 | Yoshida et al. .................. 204/35.1 |

FOREIGN PATENT DOCUMENTS

| 15597 | 5/1973 | Japan . |
| 94104 | 8/1977 | Japan . |
| 200793 | 11/1984 | Japan . |

Primary Examiner—George F. Lesmes
Assistant Examiner—William Atkinson
Attorney, Agent, or Firm—Ostrolenk, Faber, Gerb & Soffen

[57] ABSTRACT

In production of an optomagnetic recording medium having a porous anode oxidized coat on a base plate, a thin film of magnetic material of high saturated magnetization is developed after grinding and etching following formation of the anode oxidized coat in order to increase the effective reflection plane, thereby greatly raising accuracy of detection of the polarization angle at reading-out of signals.

14 Claims, 3 Drawing Sheets

OPTOMAGNETIC RECORDING MEDIUM

The present invention relates to an optomagnetic recording medium and a method for producing the same, and more particularly relates to improvement in production of an optomagnetic high density recording medium which includes magnetic material packed in pores formed in a porous anode oxidized coat made of aluminium or aluminium-base alloys.

An optomagnetic recording system based on Kerr effect has been developed recently. Upon recording in this system, a beam such as a laser is applied to the face of a magnetic member in order to heat it up to a temperature above the Curie point for writing-in of signals. Whereas at reproduction, a luminous flux of a specified polarization angle such as a laser is applied to the face of the magnetic member in order to detect the rotation angle, i.e. the polarization angle, of the polarization plane of the reflected beam for reading-out of the signals.

One example of such a high density optomagnetic recording medium is proposed in Japanese Patent Opening Sho. 59-72663. In the case of this proposed prior art, a porous anode oxidized coat is formed on a base plate made of aluminium or aluminium-base alloys and magnetic material such as pure iron is packed in pores in the anode oxidized coat by means of electrolytic separation. Such a recording medium has been developed as a vertical magnetic recording medium suited for high density magnetic recording. It is stated, however, in the above-described prior proposal that such a recording medium can advantageously be used with an optomagnetic recording system. In such a case, the magnetic material in the pores is magnetized in a direction normal to the face of the coat. Since the magnetic material packed in the pores by electrolytic separation has anisotropy in the direction normal to the face of the coat, the same can be sufficiently magnetized in the direction normal to the face of the coat. In addition, inasmuch as the reflected beam at exposed ends of the magnetic material has a large polarization angle by Kerr effect, signals can be read out very easily.

However, the above-described recording medium has several drawbacks when employed in the optomagnetic recording system. At reading-out of signals, the exposed ends of the magnetic material packed in each pore functions as an effective reflection plane for detection of the polarization angle $\theta k$ of the beam reflected by Kerr effect. In the case of a simple construction in which the magnetic material is packed in the coat pores, the absolute intensity and the S/N ratio of the polarization detection signal by the reflected beam are small in practice and this reduces the accuracy of detection. This problem is believed to be caused by the following factors.

(I) Since the surface area of the exposed end of the magnetic material acting as the effective reflection plane is fixed by the surface area of the opening of the associated pore, no large surface area can be reserved for the effective reflection plane. In addition, the rugged state of the exposed end of the magnetic material causes random reflection of the beams.

(II) Even when the anode oxidized coat has a uniform thickness, the depth of the magnetic material packed in the pores by electrolytic separation varies and such variation in depth causes corresponding variation in the polarization angle.

(III) The above-described variation in depth may cause variation in level between the exposed ends of the magnetic material in the pores, thereby causing random phase of the reflected beams.

(IV) Inasmuch as the anode oxidized coat per se is made of $Al_2O_3$ which is light permeable, applied laser beam for reading out a signal passes through the $Al_2O_3$ layer around the pore and is reflected at the boader between the anode oxidized coat and the base plate which is not anode oxidized. A part of the applied beam is reflected at the face of the $Al_2O_3$ layer around the pore. Presence of these reflected beams considerably impairs accurate detection of the polarization angle of the beam reflected at the exposed end of the magnetic material.

Some of the factors stated above may be removed by grinding the face of the anode oxidized coat so that the face should be flush with the all exposed ends of the magnetic materials. Mechanical pressure at the grinding, however, may cause strain at the exposed ends of the magnetic material and such strain induces variation in the polarization angle $\theta k$ of the reflected beam. In addition presence of residual strain on the exposed ends of the magnetic material significantly lowers the magnetic permeability of the magnetic material. For these reasons, application of grinding cannot be an expedient solution.

SUMMARY OF THE INVENTION

It is one object of the present invention to provide improved detection of the polarization angle of a beam reflected on the basis of magnetic Kerr effect at the time of reading-out of recorded signals.

It is another object of the present invention to increase the surface area of the effective reflection plane while inhibiting intrusion of the applied beam into the $Al_2O_3$ layer around each pore in the anode oxidized coat.

It is another object of the present invention to produce a high quality optomagnetic recording medium without incurring the problem of residual strain.

In accordance with one aspect of the present invention, as optomagnetic recording medium includes a porous anode oxidized coat formed on a base plate made of aluminium or aluminium base alloys, magnetic material packed in pores of the anode oxidized coat and a thin film of magnetic material of high saturation magnetization formed on the anode oxidized coat in a manner to cover at least the pores and their peripheries.

In accordance with another aspect of the present invention, at production, anode oxidization is applied to the face of a base plate made of aluminum or alluminum alloys in order to form thereon an anode oxidized coat, magnetic material is packed in pores in the anode oxidized coat by means of electrolytic separation, the total face of the anode oxidized coat is ground so that the peripheries of the pores should be flush with the exposed ends of the magnetic material in the pores, a part of the magnetic material in the pores is removed by means of etching, and a thin film of magnetic material of high saturation magnetization is formed on the anode oxidized coat in a manner to cover at least the pores and their peripheries.

DESCRIPTION OF THE PREFERRED EMBODIMENTS

Figure 1:
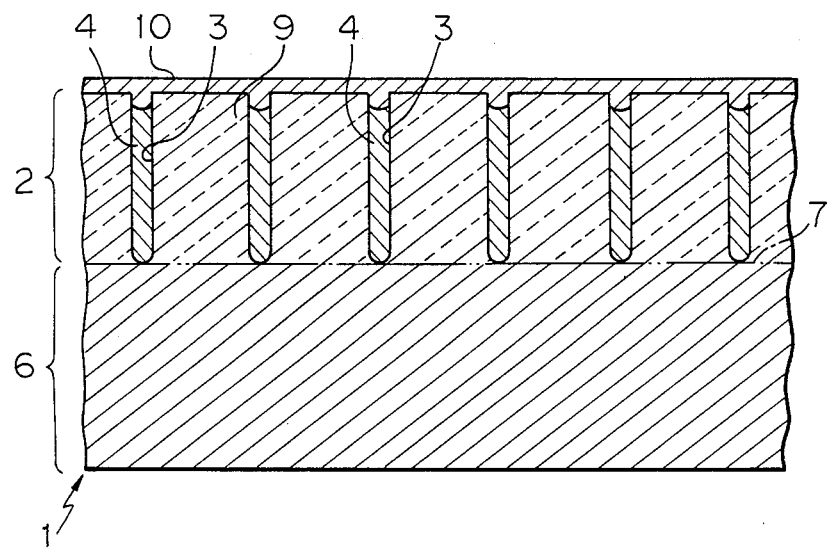
FIG. 1 is a side sectional view of one embodiment of the optomagnetic recording medium of the present invention.

One embodiment of the optomagnetic recording medium of the present invention is shown in FIG. 1, in which an anode oxidized coat 2 is formed on a base plate 1 made of aluminum or aluminium-base alloys and magnetic material 4 such as pure iron, nickel, cobalt or their alloys is packed in pores 3 in the anode oxidized coat 2. A thin, smooth film 10 of high saturation magnetization magnetic material such as iron, cobalt, nickel or their alloys is formed on the anode oxidized coat 2. The thin film 10 covers the magnetic material 4 packed in the pores 3 and the $Al_2O_3$ layer 9 around the pores 3. In the case of the illustrated example, the $Al_2O_3$ layer 9 is totally covered by the thin film 10. But this is not an absolute requirement. It is sufficient that the film should cover the $Al_2O_3$ in the range which is vertically magnetized by the magnetic fluxes generated by the magnetic material 4 packed in the pores 3. The thin film 10 should span each pore 3 and its periphery.

Method of production of such an anode oxidized recording medium will now be explained in reference to FIGS. 2 to 5.

Figure 2:
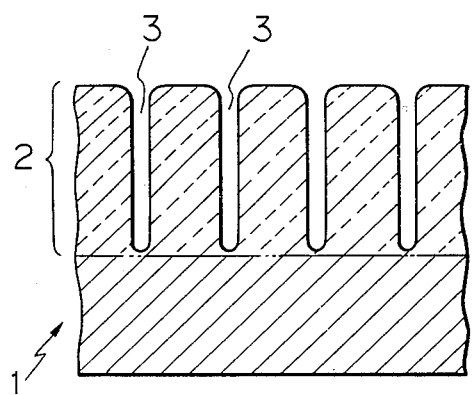
FIGS. 2 to 5 are side sectional views showing sequential operational steps of a production method in accordance with the present invention.

First anode oxidization is applied to the face of a base plate 1 made of aluminium or aluminium-base alloys in order to form an anode oxidized coat 2 having lots of pores 3 as shown in FIG. 2. This anode oxidization is practiced in any known manner. For example an inorganic acid solution such as a solution of sulfuric, chromic or oxalic acid is used. While stirring the solution, DC voltage or DC voltage combined with AC voltage is applied to the solution. In order to enlarge the diameter of the pores 3 and to provide each pore with a uniform diameter over its entire depth, the base plate 1 is immersed in a mixed acid bath including 1 to 30% by weight of sulfamic acid and 0.1 to 1% by weight of phosphoric acid.

Figure 3:
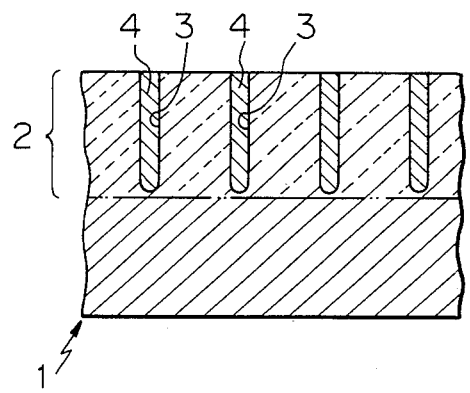

Next, as shown in FIG. 3, magnetic material such as iron, nickel or cobalt is packed in the above-described pores 3 by means of electrolytic separation in which AC voltage is applied to aqueous solution including salt of the above-described magnetic material. Such a solution may include sulfate oxide ammonium, cobalt sulfate or nickel sulfate. The solution may further include phosphoric acid and glycerine. Ordinary symmetric AC voltage may be employed in the electrolytic separation. However, higher rate of packing of the magnetic material is obtained by use of asymmetric AC voltage in which the ratio of positive side peak current density (A+) with respect to negative side peak current density (A−) is in a range from 0.2 to 0.5. When such asymmetric AC voltage is employed, the absolute value of the negative side peak current density (A−) should preferably be in a range from 0.5 to 4 A/dm².

Figure 4:
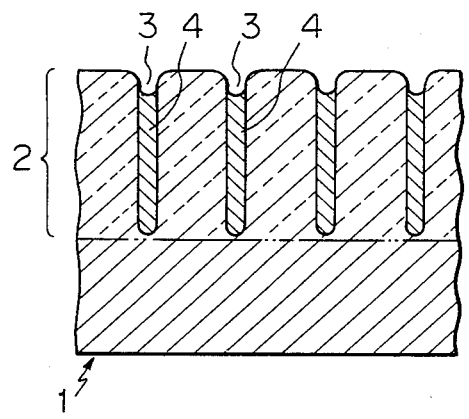

Next as shown in FIG. 4 grinding is applied to the entire face of the anode oxidized coat 2 until the exposed ends of the magnetic material in the pores 3 become flush with the face of the $Al_2O_3$ around the pores 3.

Figure 5:
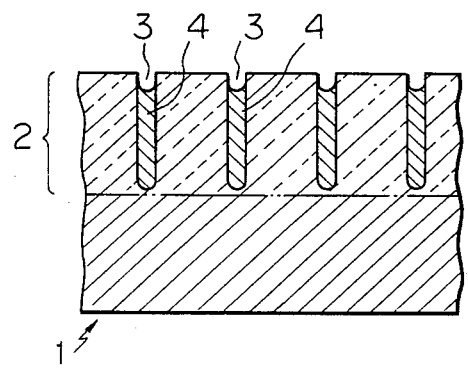

As a result of such grinding, residual strain exists at the exposed ends of the magnetic material. In order to remove this residual strain, chemical etching is employed as shown in FIG. 5. Because the $Al_2O_3$ layer 9 around the pores 3 is chemically stable, only the magnetic material can be selectively etched by use of weak acid such as 3% oxalic acid solution.

This etching forms a thin film 10 of high saturation magnetization magnetic material such as iron, nickel, cobalt or their alloys. More specifically, the saturation magnetization of the magnetic material is 0.5T or higher, more preferably 1.0T or higher. The above-described etching removes blank ends of the pores and covers the peripheries of the pores in order to form a film of a uniform thickness. At etching, electroless plating is advantageously employed. When this plating is employed, separation of the magnetic material starts at the exposed ends of the magnetic material already packed in the pores 3 due to differences in chemical potential between the metallic magnetic material and $Al_2O_3$. After the blank ends of the pores 3 are filled, separation expands to the face of the anode oxidized coat around the pores 3 and, finally, the thin film 10 covers the entire face of the anode oxidized coat 2. Depending on the case, the plating may be terminated when the thin film 10 has covered the pores 3 and their peripheries only. Vapour phase growing process, spattering or vacuum deposition may also be used for formation of the thin film 10. No further grinding is needed for the face of the thin film 10 because the face of the anode oxidized coat 2 has already been sufficiently smoothed by the previous grinding.

The thickness of the anode oxidized coat 2 on the base plate 1 should preferably be 6 μm or smaller, and more preferably 3 μm or smaller. Any thickness over 3 μm would make the magnetic material in the pores 3 too long to enable easy magnetic writting-in.

The diameter of the pores 3 in the anode oxidized coat 2 should preferably be 100 nm or smaller. When the diameter exceeds this upper limit, the magnetic material in the pores 3 would be magnetized in parallel to the coat face, or, even when vertical anisotropy exist, small vertical residual magnetization would result. For the same reasons, the ratio length L to diameter D after grinding of the pores 3 should preferably be 10 or larger.

Etching should preferably be carried out to an extent such that the magnetic material 4 in the pores 3 should be removed over a depth of 10 to 200 nm from the face. When the depth of etching falls short of the lower limit, the section of the magnetic material including the residual strain could not be removed sufficiently. When the depth of etching exceeds the upper limit, too long etching time would be resulted and the subsequent non-electrolytic plating time would also be extended, thereby significantly lowering the process efficiency.

At formation of the thin film 10, process conditions are controlled so that the resultant thickness of the film 10 should preferably be in a range from 5 to 100 nm. When the thickness falls short of 5 nm., there is no sufficiently large effective reflection plane contributing to detection of the polarization angle Ok. Further, laser may permeate through the film 10 to cause interference between the polarization angle of the magnetic material 4 and that of the film 10. Any thickness beyond 100 nm would cause interference between magnetic fluxes generated by the magnetic material in adjacent pores 3, and attenuation of anisotropy in the vertical direction.

Figure 6:
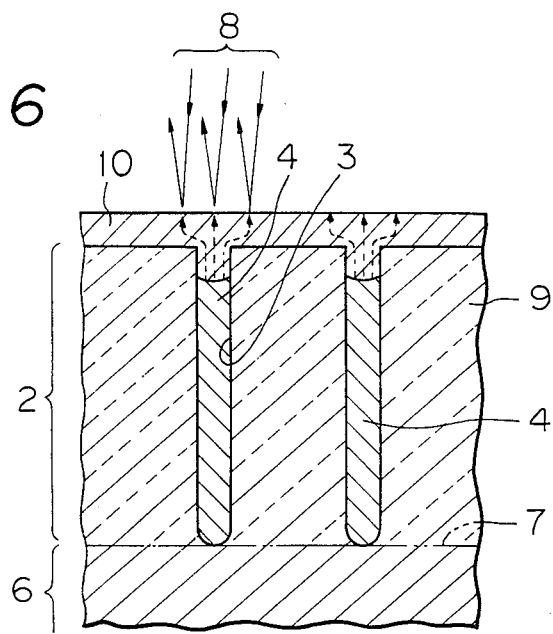
FIG. 6 is an enlarged sectional side view of an part of optomagnetic recording medium of the present invention.

Reflection of beams and flow of magnetic flux upon reading-out of signals on the optomagnetic recording medium in accordance with the present invention are schematically shown in FIG. 6. It will be clearly seen from the illustration that the translucent $Al_2O_3$ layer 9 around the pores 3 is covered by the film 10 of high saturation magnetization magnetic material and that the opaque nature of the film 10 effectively prevents laser beam 8's intrusion into the $Al_2O_3$ layer 9, so that reflection is not caused at the border 7 between the anode oxidized coat 2 and the base plate 6. Thus, reflection takes place at the face of the thin film 10 only, thereby removing any danger of interference.

In the section of the thin film 10 above the open ends of the pores 3, the magnetic flux diverges as indicated with dot lines and, as a consequence, the effective reflection plane contributing to detection of the polarization angle becomes larger than the open ends of the pores 3, thereby increasing the rate of polarization of light at reading-out of signals. In the case of the above-described conventional optomagnetic recording media, the effective reflection plane is fixed by the upper ends of the magnetic materials packed in the pores 3 only. According to the present invention, divergence of the magnetic flux in the thin film assures significant increase in effective reflection plane.

The face of the thin film for detection of the polarization angle has a uniform level and the depth of the total magnetic material normal to the face of the film is uniform. Such a uniform construction well removes the dangers of variation in phase of the reflected beams and variation in polarization angle.

Residual strain generated at the grinding (see FIG. 4) can be well removed at the subsequent etching (FIG. 5). Absence of such residual strain prevents reduction in polarization angle which may otherwise be caused by such residual strain, and thus prevents lowering the accuracy of detection which may otherwise be caused by reduced polarization angle. Absence of such residual strain much improves the magnetic permeability of the magnetic material also.

By use of high saturation magnetization magnetic material such as cobalt for the thin film 10, surfacial magnetic flux density can be remarkably increased to raise the polarization angle at reading-out of signals. It was confirmed that anticorrosion of the optomagnetic medium is significantly raised by use of permalloy for the thin film.

EXAMPLE

A rolled plate was formed of 4%Mg-Al alloy which was prepared by melting aluminium of 99.99% purity. The face of the rolled plate was ground to produce an aluminium base plate. Anode oxidization was applied to the face of the base plate using 3% oxalic acid solution as the electrolysis bath to develop a porous anode oxidized coat of 5 $\mu$m thickness. Next, electrolytic separtion was carried out by application of AC voltage to an electrolysis bath containing 50 g/l of ferros sulfate ammonium, 30 g/l of boric acid and 2 g/l of glycerine to pack pores in the anode oxidized coat with pure iron. Then, the face of the anode oxidized coat was ground down to a thickness of 3 $\mu$m. It was magnetically observed that iron in the pores mostly appeared at the face at this stage of production. Etching was applied to the ground face down to a depth of 50 nm using 3% oxalic acid solution. Finally a film of 60 nm thickness was formed on the face of the anode oxidized coat using electroless plating bath containing 5 g/l of nickel sulfate, 15 g/l of cobalt sulfate, 10 g/l of sodium bicarbonate, 30 g/l of Rochelle salt, 20 g/l of formaldehyde and some addatives.

Figure 7:
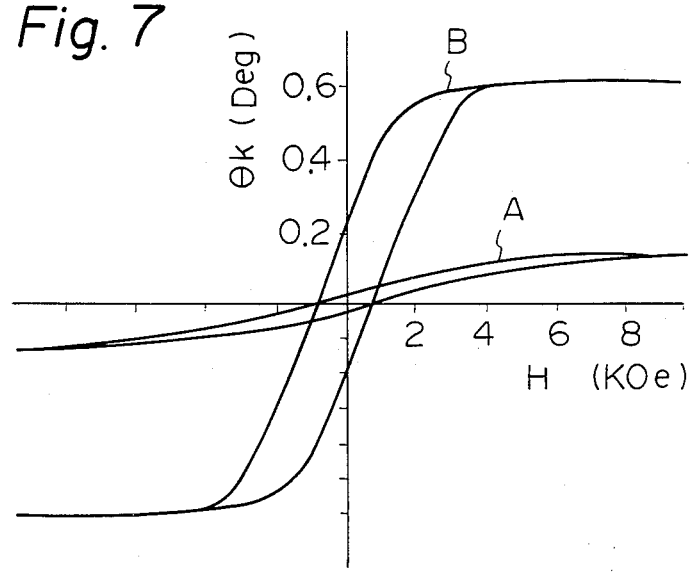
FIG. 7 is a graph for showing the hysteresis characteristics of the polarization angle, θk, vs the external magnetic field H of the an optomagnetic recording medium of the present invention.

As for a crude optomagnetic medium just after grinding and a finally produced optomagnetic medium, the hysteresic characteristics of the polarization angle $\theta k$ by Kerr effect were checked using a beam of 632 nm wave length. The results are shown in FIG. 7, in which the intensity H of the external magnetic field is taken on the abscissa.

In the graph, a curve A is for the crude optomagnetic medium. The maximum polarization angle amounts to only 0.12°. A curve B is for the final optomagnetic medium and the maximum polarization angle amounts to 0.6°. It is clearly understood from this data that formation of the high magnetization thin film much improves the magnetic property of the product.

We claim:
1. An optomagnetic recording medium, comprising:
   a base plate comprising aluminum;
   an anode oxidized coat formed on said base plate, said coat having pores therein extending inwardly from an upper surface of said oxidized coat such that each said pore has an open end at said upper surface;
   a first magnetic material packed in said pores of said anode oxidized coat; and
   a thin film of a second magnetic material having a saturation magnetization effective to allow magnetic flux to penetrate from said first magnetic material to an upper surface of said second magnetic material, said second material covering said open end of said pores and being accessible by light emitted from a source above and spaced from said upper surface of said anode oxidized coat; said film having a thickness effective to prevent penetration of light into said oxidized coat, yet being sufficiently thin to permit anisotropy in the vertical direction and to prevent interference between magnetic fluxes from said magnetic material in adjacent pores.
2. The optomagnetic recording medium according to claim 1 in which said first magnetic material comprises a metal selected from the group consisting of iron, nickel, cobalt and their alloys.
3. The optomagnetic recording medium according to claim 1 in which said second magnetic material comprises a metal selected from the group consisting of iron, nickel, cobalt and alloys thereof.
4. The optomagnetic recording medium according to claim 1 in which the thickness of said thin film is in a range from 5 to 100 nm.
5. The optomagnetic recording medium according to claim 1 in which the saturation magnetization of said second magnetic material is 0.5T or larger.
6. The optomagnetic recording medium according to claim 5 in which said saturation magnetization is 1.0T or larger.
7. The optomagnetic recording medium according to claim 1 in which the thickness of said anode oxidized coat is not more than 6 $\mu$m.
8. The optomagnetic recording medium according to claim 7 in which said thickness is not more than about 3 $\mu$m.

9. The optomagnetic recording medium according to claim 1 in which the diameter of said pores in said anode oxidized coat not more than about is 100 nm.

10. The optomagnetic recording medium according to claim 9 in which the ratio of the depth of said pores to said diameter is no less than about 10.

11. An optomagnetic recording medium comprising:
(a) a base plate comprising aluminum;
(b) an anode oxidized coat formed on a face of said base plate, said anode oxidized coat having pores therein extending inwardly from an upper surface of said oxidized coat such that each said pore has an open end at said upper surface;
(c) a first magnetic material packed in said pores of said anode oxidized coat; and
(d) a thin film of a second magnetic material covering said open ends of said pores and the portion of said upper surface of said oxidized coat immediately surrounding said open ends; said second magnetic material being accessible by light emitted from a source above and spaced from said upper surface of said anode oxidized coat and having saturation magnetization effective to allow magnetic flux to penetrate from said first magnetic material to an upper surface of said second magnetic material; said film having a thickness from about 5 nm to about 100 nm.

12. The optomagnetic recording medium according to claim 11, wherein said base plate comprises an aluminum predominant metallic material.

13. The optomagnetic recording medium according to claim 11, wherein said second magnetic material substantially covers said upper face of said anode oxidized coat.

14. The optomagnetic recording medium according to claim 11, wherein said second magnetic material has sufficient saturation magnetization to substantially preserve magnetic flux intensity from said first magnetic material to the upper surface of said second material.

* * * * *